INVENTOR.
Hang C. Wang
BY
Edward E. James
ATTORNEY

United States Patent Office 3,206,239
Patented Sept. 14, 1965

3,206,239
AUXILIARY LATCH MECHANISM FOR VEHICLE DOOR
Hang C. Wang, Detroit, Mich., assignor to General Motors Corporation, Detroit, Mich., a corporation of Delaware
Filed July 19, 1963, Ser. No. 296,262
6 Claims. (Cl. 292—198)

This invention relates to a latch mechanism for a vehicle door mounted for translatory opening movement with respect to a vehicle body defined door opening.

To provide easier access to the vehicle passenger compartment and to permit greater door opening movement in a restricted space, vehicle doors have been mounted by spaced swinging bar hinges forming quadrilateral hinge linkages. Such hinges translate the door outwardly of the vehicle body door opening with controlled outward swinging of the door. With certain side body contours, the compound motion provided also eliminates interference between the edges of the door and door opening adjacent the hinge supporting pillar.

When used with a conventional vehicle door lock or latching mechanism, however, quadrilateral swinging bar hinges generally permit cyclic rebounding of the door relative to the hinge supporting pillar during vehicle operation. This results in objectionable noise and excessive wear and destructive impacting of the interposed weatherseal. To prevent such rebounding, an auxiliary door stabilizing latching means may be provided between the hinge supporting pillar and the adjacent side face of the door. In the past, such secondary latching mechanisms have been generally connected to the primary latch mechanism for sequential or simultaneous release by appropriate operation of either an inside or outside button or handle. Such compound latching arrangements have necessarily required relatively complex detent operating linkages and excessive operating effort.

The instant invention broadly contemplates an improved auxiliary door stabilizing latch mechanism which is of relatively simple inexpensive construction and operable independently of the primary latch detent releasing means. An illustrative door stabilizing latch disclosed herein features and includes a door mounted bolt or lever swingable into door closing latching engagement with a simple keeper or striker on the adjacent hinge supporting pillar and operably connected for door latching actuation and release by a second door mounted lever engageable with the primary latch engaging pillar of the vehicle body during movement of the door adjacent thereto.

The foregoing and other objects, advantages and features of the invention will be apparent from the following description of the illustrative embodiment, having reference to the accompanying drawings, in which.

Figure 1:
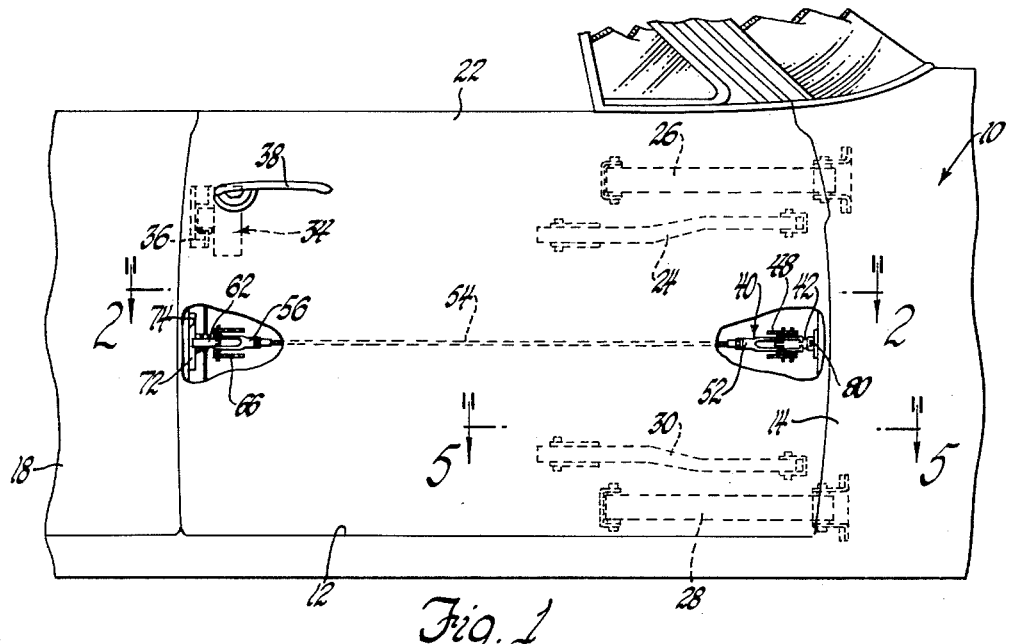
FIGURE 1 is a fragmentary side elevational view of an automotive vehicle body with portions of a door hinged for translatory swinging movement broken away to show the auxiliary secondary latch mechanism of the invention.
Figure 2:
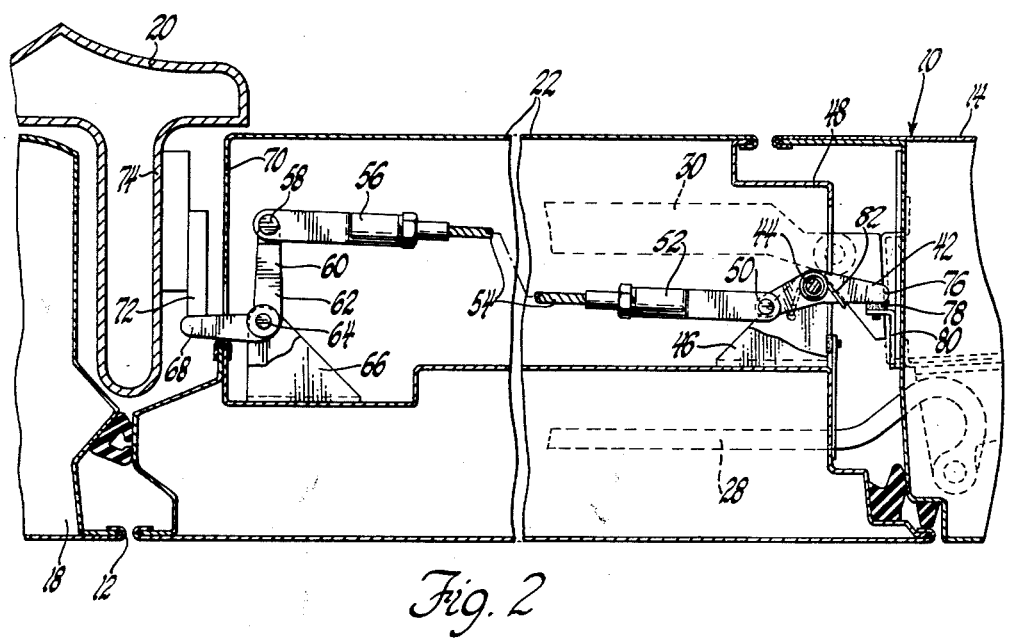
FIGURE 2 is an enlarged sectional view taken substantially in the plane indicated at 2—2 of FIGURE 1 and shows the door and the several elements of the secondary latch mechanism in closed, latch engaging positions with respect to the adjacent pillars.
Figure 3:
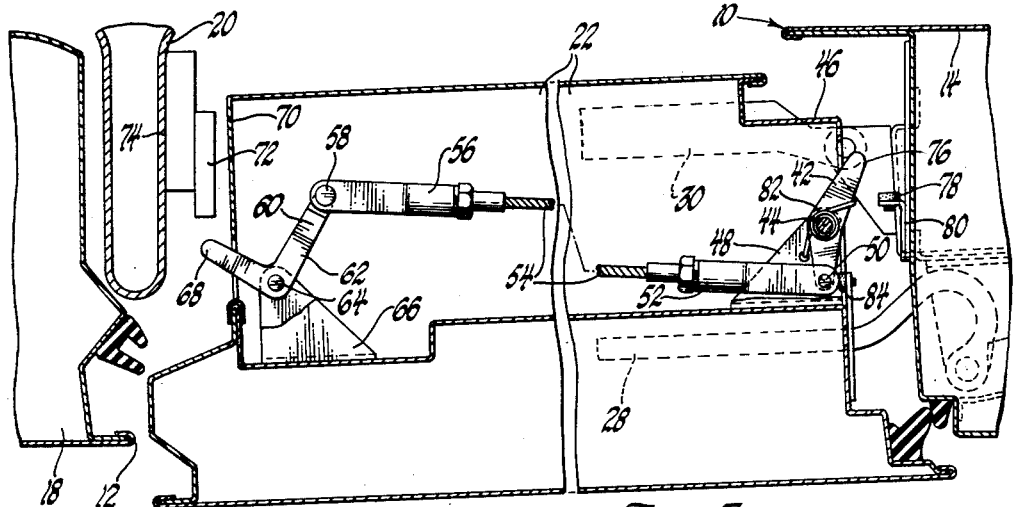
FIGURE 3 is a view similar to FIGURE 2 showing the door and secondary latching mechanism in slightly opened spaced relation to the hinge and lock pillars of the vehicle body.
Figure 5:
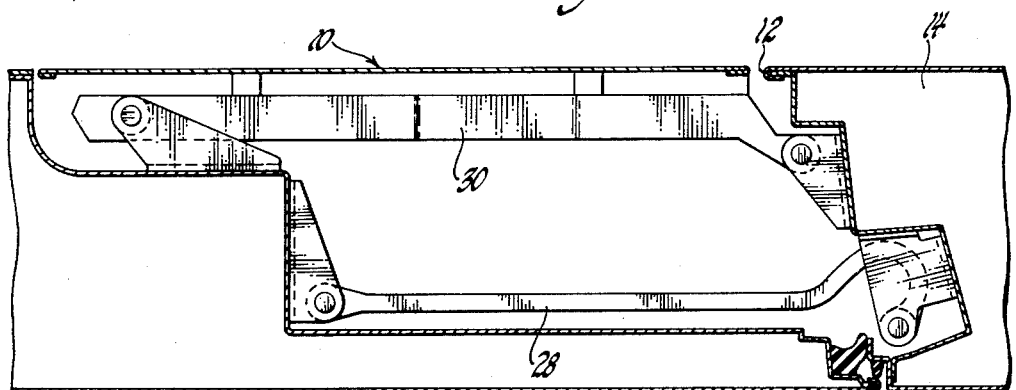
FIGURE 5 is an enlarged sectional view taken substantially in the plane indicated at 5—5 of FIGURE 1 and shows the quadrilateral swinging bar linkage hinging the lower portion of the door to the vehicle body.

As partially shown in FIGURE 1, a vehicle body 10 is provided with a front door opening 12. This door opening is defined between a hinge supporting front pillar 14 and the forward edge of a rear door 18 suitably hinged to a center post or door pillar 20. A door 22 is hinged to the front pillar 14 by vertically spaced and laterally offset swinging bar hinges 24, 26, 28 and 30. As best seen in FIGURES 2, 3 and 5, the inner primary door supporting hinges 24 and 30 cooperate with the intermediate and outwardly mounted control hinges 26 and 28 to define quadrilateral swinging bar linkages adapted to translate the door outwardly and forwardly of the weatherseal engaging closed position shown in FIGURES 1 and 2 with controlled outward swinging movement of the door to a fully opened position, not shown.

The door 22 is provided with a primary door lock or latch mechanism shown in broken lines at 34 in FIGURE 1. This latch mechanism may be of any suitable conventional design, such as that shown in United States Patent No. 2,871,049 entitled "Rotary Gear Bolt Door Latch," Cockburn et al., having a detented bolt engageable with a mating conventional striker or keeper 36 mounted on center door pillar 20. The bolt detenting linkage of this primary latch mechanism is operably connected for bolt releasing disengagement by alternative operation of a push button or handle indicated at 38 or a door mounted inside handle, not shown.

In accordance with the invention, door closing movement relative to the primary lock pillar 20 is operable through a door stabilizing auxiliary latch mechanism 40 to provide corresponding final closing movement of the hinge supported forward portion of the door and to maintain or stabilize the forward portion of the door in a weatherseal engaging, fully closed latched position relative to the hinge supporting pillar 14 corresponding to the door closed position rearwardly effected and maintained by the primary latch mechanism.

Figure 4:
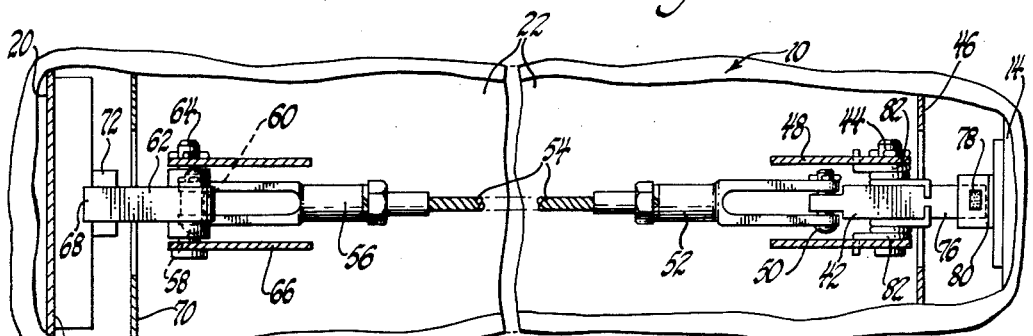
FIGURE 4 is an enlarged view showing the broken-away portions of FIGURE 1 in greater detail.

The auxiliary door stabilizing latch mechanism 40 is preferably located intermediate the upper and lower hinges and includes a bell crank bolt lever 42 pivotally mounted at 44 by a clevis bracket 46 adjacent an opening provided in the forward jamb facing end wall 48 of the door. As best seen in FIGURES 2–4, an inner operating arm of the bolt lever 42 is pivotally connected at 50 to a connector 52 suitably secured to one end of a cable 54. A similar connector 56 pivotally connects the opposite end of the cable at 58 to an arm 60 of a bolt operating bell crank lever 62. This second lever is pivotally mounted at 64 by a clevis bracket 66 suitably supported within the door adjacent an opening in the rear jamb facing end wall 70 of the door. A second arm 68 on the lever 62 projects outwardly through the opening provided in the door end wall 70 and is engageable during final door closing movement with a striker plate 72 adjustably mounted on the jamb face 74 of the center pillar 20. Such engagement rotates the lever 62 in a counterclockwise direction, as shown in FIGURES 2 and 3, and acts through the connecting cable 54 to rotate the bolt lever 42 in a clockwise direction. This rotation of the bolt lever carries a second arm 76 thereon into door closing latching engagement with a bumper 78 suitably supported by an angled keeper 80 secured to the jamb face of the adjacent hinge pillar 14. The bolt lever 76 thus effects final door closing movement of the forward door portion to an auxiliary latch maintained closed position corresponding to that rearwardly maintained by the primary latch mechanism.

As best seen in FIGURE 3, a helical spring 82 embraces the pivot 44 of the bolt lever and is torsionally interposed between the bolt lever 42 and the bracket 48 to normally bias the bolt lever in a counterclockwise latch disengaging direction. During initial door opening movement, this biasing action of the spring 82 rotates the bolt lever 76 to a stop-limited, keeper-disengaged retracted position wherein the pivoted end of the cable connector 52 abuts a door mounted bumper 84. This spring biased rotation of the bolt lever 42 counterrotates the bolt operating lever 62 in a clockwise direction to a corresponding cocked position permitting bolt actuating engagement between the lever arm 68 and the striker plate 72 during subsequent door closing movement.

From the foregoing description, it will be seen that the invention provides a relatively simple inexpensive auxiliary latch mechanism capable of stabilizing a vehicle door mounted for translatory swinging movement in a fully closed position independently of a primary latch detent releasing connection. It will be further apparent to those skilled in the art that various changes and departures might be made in and from the disclosed illustrative structure without departing from the spirit and scope of the invention as defined in the following claims.

I claim:

1. In combination with a vehicle body having a door hinged along one side for translatory swinging movement between opened and closed positions relative to a body defined door opening, a latch mechanism operable to maintain the hinged side of the door in closed position relative to the body door opening, said latch mechanism including a keeper mounted on the hinge side of the body door opening, a bell crank bolt lever pivotally mounted intermediate its ends on the hinged side of the door and having one arm thereon swingable into door closing latching engagement with said keeper, a second bell crank latch operating lever pivotally mounted intermediate its ends on the opposite side of the door and engageable with the adjacent side of the body door opening during door closing movement relative thereto, and means interconnecting the other arms of said bell crank levers and operable to translate door closing swinging movement imparted to said operating lever into door closing and latch engaging swinging movement of said bolt lever.

2. The combination set forth in claim 1 further including spring means for normally biasing said bolt lever toward a latch disengaging position whenever the door is opened thereby positioning said latch operating lever for potential latch operating engagement with the adjacent side of the body door opening during subsequent door closing movement.

3. The combination set forth in claim 1 further including a separate selectively releasable latch means normally operable to maintain said opposite side of the door in closed position relative to the door opening of the vehicle body.

4. In combination with a vehicle body having a door hinged at one side for translatory swinging movement between opened and closed positions relative to a body defined door opening, a primary latch means operable to maintain the side of the door opposite the hinged mounting thereof in closed position relative to the adjacent side of the body door opening and selectively releasable to permit door opening movement, a secondary auxiliary latch means operable to maintain the hinged side of the door in closed position relative to the hinge supporting side of the body door opening, said secondary latch means including keeper means mounted on the adjacent hinge supporting side of the door opening, a first lever pivotally mounted adjacent the hinged side of the door and having a bolt arm thereon swingable into door closing latching engagement with said keeper means, a second latch operating lever pivotally mounted adjacent said opposite side of the door and having an arm thereon engageable with the adjacent side of the body door opening during door closing movement relative thereto, means interconnecting said first and second levers and operable to transmit door closing swinging movement imparted to said operating lever arm to effect corresponding door closing latch engaging swinging movement to said first lever bolt arm, and spring means normally biasing said bolt lever toward a keeper disengaging position whenever the door is released by the primary latch means for movement to an opened position thereby positioning said operating lever to initiate door opening movement and for subsequent latch operating engagement with the adjacent side of the door opening.

5. In combination with a vehicle body having a door mounted for translatory movement between opened and closed positions relative to a body defined door opening, a latch mechanism operable to maintain one side of the door in closed position relative to an adjacent side of the body door opening, said latch mechanism including keeper means mounted on said adjacent side of the body door opening, pivotal latch means mounted on said one side of the door and swingable into door closing latching engagement with said keeper, pivotal latch operating means mounted on the opposite side of the door and engageable with the opposite side of the body door opening during door closing movement, and connecting means operable to transmit pivotal door closing movement imparted to said latch operating means to said latch means thereby effecting simultaneous door closing and keeper engaging actuation of said latch means.

6. The combination set forth in claim 5 further including a second latch mechanism normally operable to maintain said opposite side of the door in a closed latch position relative to said opposite side of the body door opening and manually releasable independently of said first-mentioned latch mechanism to permit initial opening movement of said opposite side of the door, and means normally biasing the several means of said first-mentioned latch mechanism to effect initial door opening movement permitted by releasing said second latch mechanism and to disengage said latch means from said keeper means with corresponding positioning of said latch operating means for subsequent door closing operating engagement thereby permitting further opening movement of the door to its fully opened position.

References Cited by the Examiner

UNITED STATES PATENTS 2,157,016    5/39    Reynaud _____ 292—198 X
3,006,683    10/61   Smith _____ 16—163 X M. HENSON WOOD, JR., *Primary Examiner.*